United States Patent [19]
Verrijp et al.

[11] Patent Number: 5,697,837
[45] Date of Patent: Dec. 16, 1997

[54] POULTRY BREAST FILLETING APPARATUS

[75] Inventors: B. Verrijp; W. Steenbergen, both of Numansdorp; G. Barendregt, Thorbeckehof, all of Netherlands

[73] Assignee: Sytemate Holland, B.V., Numansdorp, Netherlands

[21] Appl. No.: 502,972

[22] Filed: Jul. 17, 1995

[51] Int. Cl.[6] .................................................. A22C 21/00
[52] U.S. Cl. ........................ 452/170; 452/165; 452/136
[58] Field of Search ................................... 452/170, 165, 452/149, 127, 136

[56] References Cited

U.S. PATENT DOCUMENTS

| | | | |
|---|---|---|---|
| 4,682,386 | 7/1987 | Hazenbroek et al. | 452/165 |
| 4,873,746 | 10/1989 | Scheier et al. | 452/136 |
| 4,993,114 | 2/1991 | Meyer et al. | 452/136 |
| 5,001,812 | 3/1991 | Hazenbroek | 452/135 |
| 5,045,024 | 9/1991 | Diesing | 452/165 |
| 5,269,722 | 12/1993 | Diesing et al. | 452/165 |
| 5,372,539 | 12/1994 | Kunig et al. | 452/136 |
| 5,474,491 | 12/1995 | Koch | 452/165 |

FOREIGN PATENT DOCUMENTS

0 401 528   4/1994   European Pat. Off. .

*Primary Examiner*—Willis Little
*Attorney, Agent, or Firm*—Thomas, Kayden, Horstemeyer & Risley

[57] ABSTRACT

Previously eviscerated poultry carcasses are moved in series along a conveyor (17), mounted upon a series of modules (22). As the poultry carcasses are moved along their processing path and are mounted on their modules (22), the carcasses are automatically engaged by a clamp tool (48) that clamps the poultry carcasses against their modules (22) in tight locking engagement to hold the poultry carcasses on their modules (22). A series of meat removal stations (61, 62, 63 and 64) engage and progressively separate the meat from the skeletal structures of the poultry carcasses as said poultry carcasses are moved along their processing path by the conveyor (17).

17 Claims, 5 Drawing Sheets

POULTRY BREAST FILLETING APPARATUS

FIELD OF THE INVENTION

This invention relates to a method and apparatus for processing eviscerated poultry carcasses. In particular, this invention relates to a method and apparatus for automatically separating and removing fillets of meat from the skeletal structures of the breast and adjacent back portions of previously eviscerated poultry carcasses.

BACKGROUND OF THE INVENTION

In the processing of poultry such as chickens, turkeys, and other birds, it has become highly desirable to separate the meat from the skeletal structures of the poultry carcasses so that the meat can be marketed and sold without including the bones therewith. Boneless fillets of poultry meat are increasingly preferred by the consuming public and by restaurants, etc. as the meat can be cooked and served in sandwiches or served in relatively small portions that are easy to cut and eat without requiring the consumer to separate the meat from the bone. Additionally, another significant advantage of separating the bones from the meat of the edible poultry carcasses is that when the meat is later cooked, the bone does not need to be cooked. Not having to cook the bones with the meat saves energy and enables the meat to be cooked more uniformly throughout. Further, if the bones are separated from the meat prior to cooking, the bones conveniently can be saved and processed for other uses such as bone meal, etc.

In the past, the process of filleting poultry parts, such as thighs and breasts, generally was a manual process, requiring workers to strip the meat from the bones of the poultry carcasses by hand. Recently, the stripping of the meat of poultry parts has become automated with the introduction of automated deboning and cutting equipment. For example, U.S. Pat. Nos. 3,672,000, 4,068,350, 4,327,463, 4,893,378, and 5,001,812 all disclose apparatus for deboning poultry thighs and similar products wherein the bones of such products are substantially rectilinear and the meat can be scraped longitudinally off the bone. The skeletal structures of the breasts and related parts of poultry carcasses, however, are of a more complex configuration than the bones of poultry thighs or similar parts, and therefore it has been more difficult to separate the meat from the bones of the skeletal structures of the breasts and related parts of the poultry carcasses. In general, the ribs, keelbone and other bones of the skeletal structure of the breast and related parts of a poultry carcass are more delicate and easily broken than are the poultry thigh bones and thus greater care must be taken when filleting the breasts and adjacent back portions of meat from the skeletal structures of the breasts, etc. of poultry carcasses.

Recently, automated equipment has been developed which operates to remove the meat from the skeletal structures of the breasts and adjacent back portions of poultry carcasses. For example, U.S. Pat. No. 4,682,386 discloses a system by which previously eviscerated poultry carcasses are automatically filleted. The poultry carcasses are mounted on a series of mandrels or carcass carriers and are moved along a processing path where a series of cutting stations engage and remove the meat from the skeletal structure of the breast and back portions of the carcass. A similar poultry breast filleting system is taught in U.S. Pat. No. 5,372,539 and in European Patent No. EPO 401,528,B1 which also shows the use of a pivoting clamping lever to help hold the carcasses to their mandrels. Additionally, U.S. Pat. No. 5,045,022 shows an automated poultry breast filleting system in which poultry carcasses are carried along a processing path wherein the meat is separated from the skeletal structures of the poultry carcasses, with the system further including an adjustable cutting means that can be raised into the path of movement of the carcasses to separate the fillets of the carcasses into two portions.

In general, with conventional poultry breast filleting apparatus, the carcasses typically are forced down onto the mandrels or carcass carriers of the apparatus and are held in place by the skeletal structures of the carcass or carcasses being conformed to and fitting about the mandrels in a tight frictional engagement. Often during the cutting and stripping of the fillets of meat from the skeletal structures, however, the skeletal structures can shift or twist and thus tend to become misaligned as the poultry carcasses move through the cutting stations. As a result, the bones of the skeletal structure can be engaged or gouged by the cutting blades of the processing apparatus, creating chips or bone fragments that can become lodged in the breast meat, and the cutting stations will not completely separate and remove the meat from the skeletal structures.

Accordingly, it is seen that a need exists for an automated poultry breast filleting apparatus that can remove fillets of meat from the breasts and adjacent back portions of poultry carcasses with the poultry carcasses stabilized and maintained in a desired orientation to ensure the substantially complete and accurate removal of the meat from the skeletal structures of the breasts and adjacent back portions of the poultry carcasses.

SUMMARY OF THE INVENTION

Briefly described, the present invention comprises a poultry breast filleting apparatus for automatically removing fillets of meat from the breasts and adjacent back portions of previously eviscerated poultry carcasses. The filleting apparatus includes a series of modules or carcass carriers mounted in spaced series along a conveyor that conveys the modules about a substantially elliptical processing path. Each of the modules is a substantially rectangularly shaped block formed from nylon or similar material, and each generally is shaped to conform to the shape of the interior of the skeletal structure of the breast and adjacent back portions of a poultry carcass. The modules generally include a base portion, a middle body portion having substantially flat vertically extending side surfaces, leading and trailing ends, and a tapered top portion.

A clamping means is mounted to each module along a downwardly sloping portion between the top portion and leading end of each module. The clamping means generally comprises a clamp tool that is a hooked or curved fork pivotally attached at its lower end to the middle body portion of the module, and including curved, spaced tines. The clamp tool is pivotable from an unclamped, nonengaging position rearwardly toward the upper surface of the module into a clamping position. Additionally, a pair of pins or prongs are mounted to the top portion of the modules, positioned one behind the other and facing forwardly toward the clamp tool. The pins engage the poultry carcass in combination with the clamp tool to hold the carcass securely on the module. In the clamping position, the tines of clamp tool engage the breast of the poultry carcass with the tines positioned on opposite sides of the keel bone or sternum of the poultry carcass with the keel bone received therebetween. In a preferred embodiment, the tines of the clamp tool move toward a straddling position with respect to at least one of the pins of the module, causing the carcass to be urged toward and become impaled by the pins. As a result, the skeletal structure of the carcass tends to conform to the shape of the module and is impaled on the pins to stabilize the carcass on the module to prevent the carcass from shifting or twisting during processing.

A cam wheel is rotatably mounted within the base of each module. The cam wheel of each module has a substantially X-shaped configuration, having approximately four cam protrusions or arms arranged at approximately 90° intervals. The cam wheel is mounted within the base of each module such that one of its cam protrusions projects downwardly from the lower surface of each module. Each of the cam wheels is connected to the clamp tool via a linkage such that the rotation of the cam wheel causes the clamp tool to pivot between its unclamped and clamped positions. As the modules are moved along their processing path by the conveyor of the filleting apparatus, the downwardly extending cam protrusions of the cam wheels are carried into engagement with a cam block positioned beneath the conveyor and along the processing path of the modules. As the cam protrusions of the cam wheels of the modules engage the cam plate, the cam wheels are rotated approximately ninety degrees in response to which the clamp tool is pivoted forwardly into its engaging clamping position engaging the breast and keel bone of the poultry carcass. As a result, the poultry carcasses are automatically clamped to their modules, as the modules are inverted and carried along the lower run of their processing path through a series of successive processing stations that cut and strip the fillets of meat from the skeletal structures of the poultry carcasses.

As the poultry carcasses are moved along the lower run of their processing path, by the movement of the modules along the conveyor, the carcasses initially are engaged by a first cutting station, comprising a precutter. The precutter generally includes a pair of moveable support blocks mounted on opposite sides of the processing path of the carcasses each having a rearwardly extending, sloped guide finger or rod and an angled cutting blade mounted thereto. Immediately prior to the modules entering the precutter, the support blocks are engaged by cam blocks mounted to the spacer blocks immediately preceding each module. The cam blocks cause the support blocks to pivot so as to move the guide fingers and cutting blades inwardly toward the processing path of the carcasses. The guide fingers engage the sides of the poultry carcasses and urge the skeletal structures of the poultry carcasses tightly against the side surfaces of the modules so as to position the meat and skeletal structures of the poultry carcasses in alignment with the cutting blades. The cutting blades cut into the meat of the carcass adjacent the bones of the skeletal structure of each carcass to create and open a guide incision between the meat and skeletal structures of the poultry carcasses.

The modules thereafter enter a second cutting station in which the poultry carcasses are engaged by a middle block assembly that cuts along the guide incision formed by the precutter through the cut along the lower ribs of the skeletal structure of the poultry carcasses. The middle block assembly generally includes a spring biased slotted plow blade that is pivoted into engagement with the carcasses in timed relation with the movement of the modules along the conveyor means. The plow blade cuts into the poultry carcasses adjacent the middle of the poultry carcasses and begins the separation of the breast meat from the skeletal structure of the poultry carcasses opening and splaying the meat outwardly from the skeletal structures of the poultry carcasses. Immediately downstream from the block assembly is a third cutting station, comprising a fillet tunnel assembly positioned in the path of movement of the poultry carcasses along their processing path. The fillet tunnel assembly includes a pair of curved tunnel blades that are pivotable into a position in the processing path of the poultry carcasses. The tunnel blades engage the poultry carcasses, cutting through the meat of the poultry carcasses along the rib cages of the skeletal structures thereof so as to complete the removal of the breast and adjacent back meat from the clavicles and ribs of the skeletal structures of the poultry carcasses.

With the meat substantially cut away from the skeletal structures of the poultry carcasses, the poultry carcasses thereafter are carried into engagement with a fillet removing means. The fillet removing means generally includes a pair of fillet remover gears, positioned parallel to and spaced from one another straddling the center of the processing path so that the keel bones of the poultry carcasses pass between the teeth thereof. A remover roll is positioned below and slightly upstream from the fillet remover gears. The remover roll tends to engage and pull the meat of the poultry carcasses rearwardly and away from the skeletal structures while the portion of the breast meat of the poultry carcasses that remains attached to the keel bones of the poultry carcasses being engaged and peeled away from the keel bone by the rotating fillet remover gears. The fillets of meat tend to drop away for collection as the modules continue along their processing path.

Thereafter, the cam wheels of the modules engage a second cam plate, which causes the cam wheels of the modules to be rotated approximately ninety degrees. In response to the further rotation of the cam wheels of modules, the clamp tools of the modules are pivoted away from the poultry carcasses, into a non-engaging, unclamped position to enable the skeletal structures of the poultry carcasses to be dislodged from the modules. As the modules continue forwardly, the modules pass between a pair of stripper blades that engage and urge the skeletal structures downwardly and off of the modules.

It therefore is an object of this invention to provide an automated poultry breast filleting apparatus for removing fillets of meat rapidly and reliably from the skeletal structures of poultry carcasses.

Another object of this invention is to provide an automated filleting apparatus for removing fillets of meat from the skeletal structures of previously eviscerated poultry carcasses with the poultry carcasses engaged and held in a secure, stable orientation to prevent the poultry carcasses from shifting or becoming dislodged from their modules during processing.

Still another object of this invention is to provide an automated filleting apparatus in which fillets of meat automatically are removed from the skeletal structures of the breast and adjacent back portions of poultry carcasses, including a means for automatically clamping and holding poultry carcasses against their modules to ensure accurate and substantially complete separation of the fillets of meat from the skeletal structures of the poultry carcasses.

Other objects, features and advantages of this invention will become apparent upon reading the following specification, when taken in conjunction with the accompanying drawings.

DETAILED DESCRIPTION OF THE PREFERRED EMBODIMENT

Figure 1:
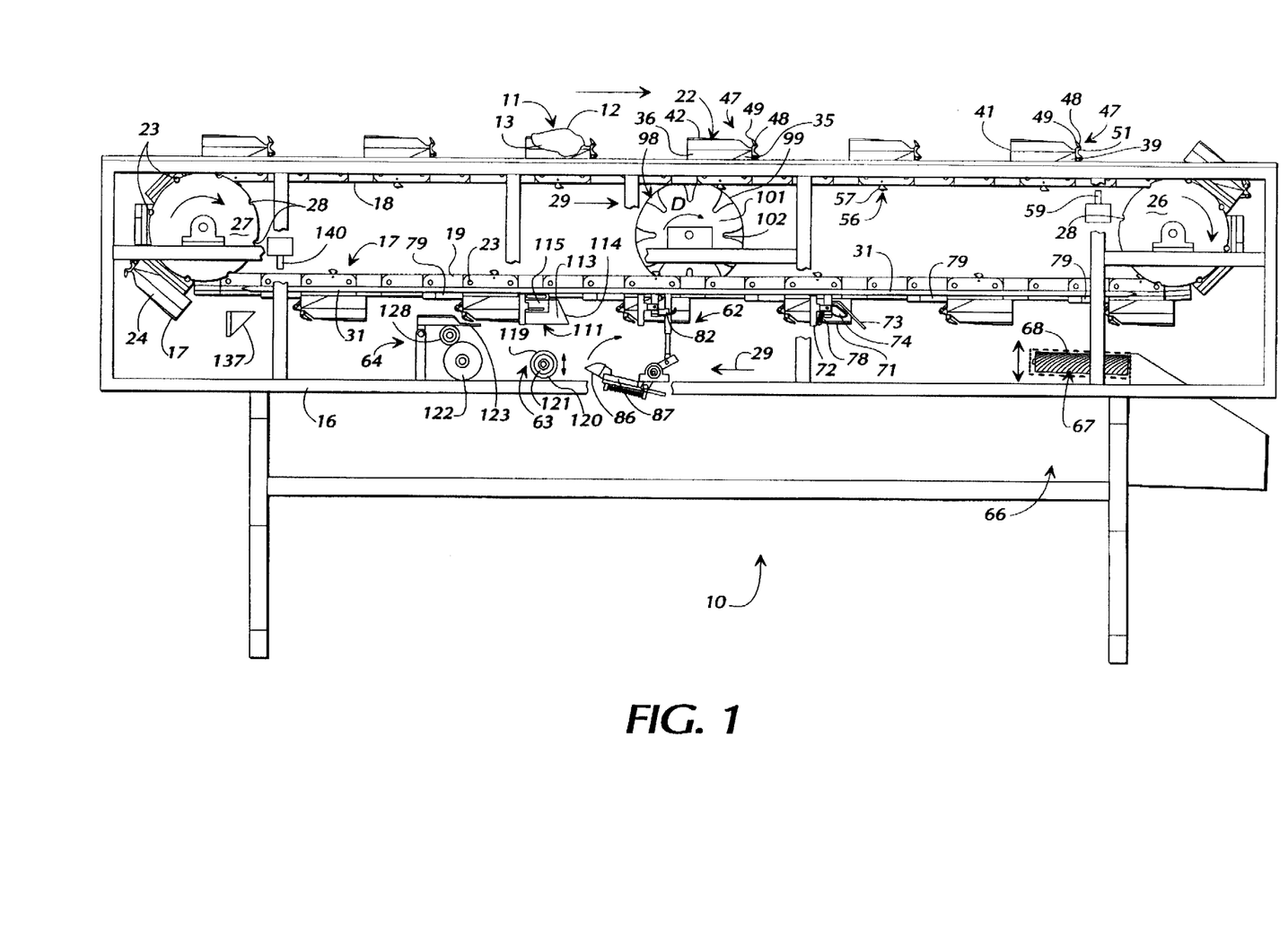
FIG. 1 is a side elevational view of the poultry breast filleting apparatus.
Figure 2A:
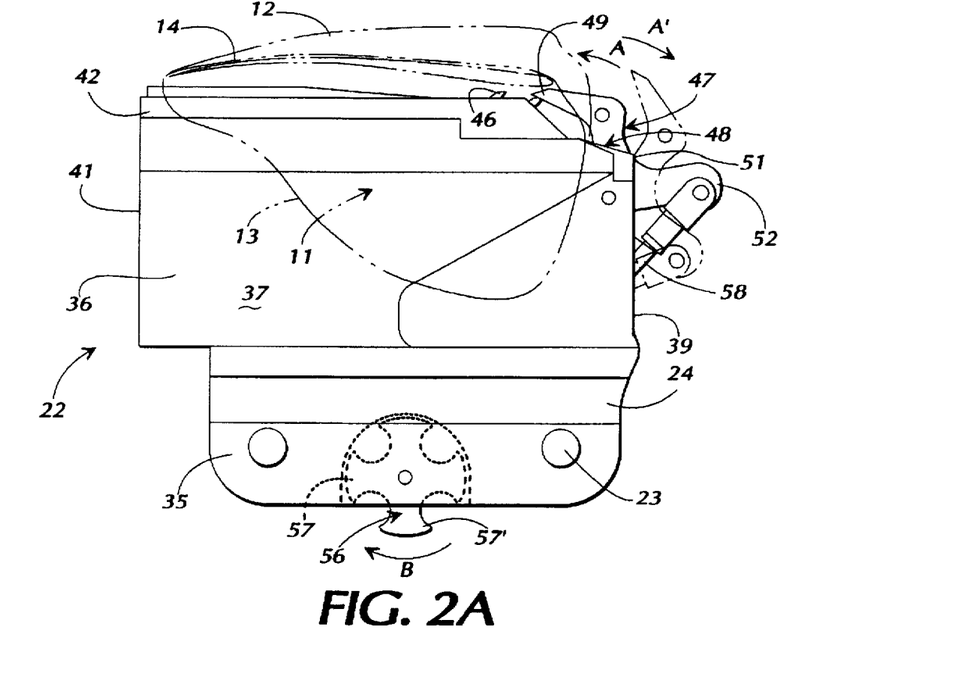
FIG. 2A is a side elevational view of a module with a poultry carcass mounted thereto.
Figure 2B:
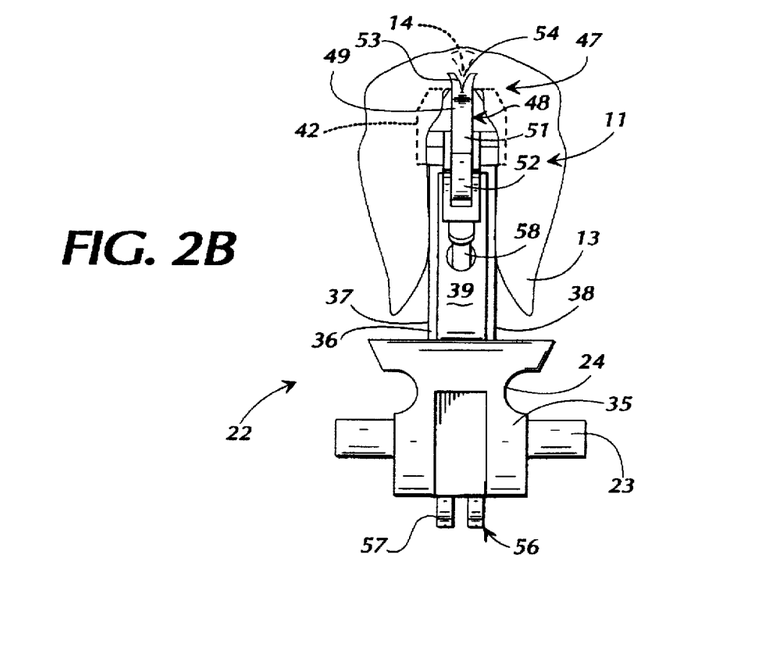
FIG. 2B is a front end view of a module with a poultry carcass mounted thereto and showing the engagement of the clamp tool with the keel bone and poultry carcass.

Referring now in greater detailed to the drawings in which like numerals indicate like parts throughout the several views, FIG. 1 illustrates the breast filleting apparatus 10 for removing fillets of meet from poultry carcasses 11. As shown in FIGS. 1–2B, each of the poultry carcasses includes breast portions 12 and adjacent back portions 13, with a keel or breast bone 14 (shown in dashed lines in FIG. 2B) extending approximately to the center of the breast portions of the carcasses. Typically, the carcasses previously will have been eviscerated with their necks, wings, legs, thighs and a portion of their backs having been removed. The poultry carcasses further include a skeletal structure (not shown), including the keel bone to which a series of outwardly curving ribs and the clavicles or wish bones of the carcasses are attached.

As shown in FIG. 1, the breast filleting apparatus 10 generally is a stand-alone processing apparatus having a framework 16 that supports a continuous conveyor 17 extending along the length of the framework and having an upper run 18 and a lower run 19. The conveyor is formed from a series of spacer blocks 21 and a plurality of modules or carcass carriers 22 connected thereto at spaced intervals along the conveyor 17. The spacer blocks 21 generally are substantially rectangularly shaped blocks formed from nylon or similar durable material, and are hingedly connected in series. A pair of pusher pins 23 mounted along the side surfaces of the spacer blocks and modules, and longitudinally extending grooves or slots 24 are formed along the side surfaces of the modules and spacer blocks.

A pair of conveyor sprockets 26 and 27 are rotatably mounted to the framework 16 at opposite ends of the framework. Each conveyor sprocket generally is a substantially circularly shaped wheel or disc having a series of spaced recesses 28 formed about its circumferences. The conveyor 17 is encircled about the conveyor sprockets 26 and 27 with the pusher pins 23 mounted to each of the spacer blocks 21 received within and engaging the recesses of the conveyor sprockets. A drive means such as an electric motor (not shown) is connected to one of the conveyor sprockets, driving the conveyor sprocket, which in turn drives the conveyor 17 to move the modules with poultry carcasses 11 mounted thereon about a substantially elliptical processing path indicated by arrows 29.

Additionally, guide rails 31 are mounted to the framework 16, positioned adjacent and extending parallel to the lower run 19 of the conveyor. As the spacer blocks 21 and modules 22 turn downwardly and begin their movement along the lower run of the conveyor, the spacer blocks and modules tend to engage and ride along the guide rail with the guide rails received in the grooves 24 of the spacer blocks and the modules. The guide rails thus tend to stabilize the modules and spacer blocks of the conveyor as the modules move along their processing path, in order to keep the modules in a predetermined attitude as the meat is stripped from the poultry carcasses.

As shown in FIGS. 2A and 2B, each module or carcass carrier generally is formed from nylon or similar material and is configured so as to approximately correspond to the shape of inner cavity of the skeletal structure of each poultry carcasses to enable the carcasses to be received and fitted thereover. Each module 22 generally comprises a base portion 35, a middle body portion 36 having substantially flat vertically extending side surfaces 37 and 38, a leading or front end 39, a trailing or rear end 41 and a tapered top portion or head 42. The base portions 35 generally are a substantially rectangularly-shaped blocks hingedly connected at each end to the spacer blocks immediately preceding and following the modules. As shown in FIG. 2B, the tapered top portion or head 42 of each module is slightly wider than the middle body portion 36 so as to overlie the side surfaces 37 and 38 of the middle body portion. The top portions of the modules further include a forward sloping portion 44 that slopes toward the leading end 39 of each module, and includes prongs or pins 46 mounted thereto. The pins project upwardly and forwardly from the forward sloping portions of the modules and have pointed ends adapted to impale and become embedded within the carcasses when the carcasses are placed on the modules. The pins tend to engage the skeletal structures of the poultry carcasses along the keel bones of the carcasses to stabilize and help hold the skeletal structures of the poultry carcasses against the top portions of the modules.

Each module 22 further includes a clamping means 47 pivotally attached to each module at the leading end 39 thereof. As shown in FIGS. 2A and 2B, the clamping means 47 includes a curved, substantially S-shaped clamp tool 48 having a hooked first end 49, a middle section 51 that is pivotally attached to its module, and a second end 52. As FIG. 2B illustrates, the first end 49 of the clamp tool 48 typically is formed as a fork having a pair of spaced tines 53 defining a bone receiving recess 54 therebetween. The clamp tool 48 is pivotable, as indicated in FIG. 2A, in the direction of arrows A and A' between a clamping position in engagement with the breasts 12 of the poultry carcasses 11, with the keel bones 14 thereof received within the bone receiving recesses 54 and the tines 53 engaging the breast portion, and an unclamped position pivoted out of engagement with the poultry carcasses. The poultry carcasses generally are mounted upon the modules with the interior cavities defined by the skeletal structures of the carcasses receiving the modules therein. In such mounting, the ribs of the skeletal structures of the poultry carcasses are received over the side surfaces of the middle body portions of the modules and the keel bones of the carcasses against the top portions of the modules, the pins 46 engaging the meat and bones of the poultry carcasses along the keel bone. Thereafter, the carcasses are engaged by the clamp tool, which is pivoted in the direction of arrows A into its clamping position (FIG. 2A) to urge and hold the poultry carcasses into tighter engagement with the pins 46 to prevent shifting or dislodging of the poultry carcasses from the modules during the processing.

Additionally, each module further includes a pair of cam wheels 56 pivotally mounted to the base portion 35 thereof. The cam wheels generally are substantially T-shaped members formed from nylon or similar material and include a series of approximately four cam protrusions or arms 57.

The cam wheels 56 are connected to the second ends 52 of the clamp tools 48 by linkages 58 that are received through the middle body portions of the modules. The cam wheels are rotatably mounted to the base portion of the modules such that one of the arms 57 thereof projects downwardly from the bottom surfaces of the base portions of the modules. As illustrated in FIG. 1, as the modules are moved along the upper run 18 of the conveyor 17 along their processing path 29, the downwardly projecting arms 57' of their cam wheels are carried into engagement with a first clamp plate 59 mounted to the framework along the path of travel of the modules, positioned so as to engage the cam wheels of the module. As the cam wheels of the modules engage the first cam plate 59, the cam wheels are rotated rearwardly in the direction of arrow B (FIG. 2), which causes the linkage 58 connecting the cam wheels with the second end of the clamp tool to be urged upwardly. In turn, the hooked first end 49 of the clamp tool is pivoted forwardly in the direction of arrow A into engagement with the breast and keel bone of the poultry carcass mounted to each module. As a result, the clamp tools of the modules are moved automatically into their clamping positions pressing the skeletal structures of the carcass toward engagement against the pins of the modules. The modules accordingly function as mandrels that, together with the action of the clamping means urging the poultry carcasses into tight engagement against the pins, support the skeletal structures of the poultry carcasses in a stable, secure position during the meat removing process.

As shown in FIG. 1, following the engagement of the poultry carcasses 11 by the clamping means 47 of the modules 22, the modules are inverted as they begin to move along the lower run of the conveyor. The inverted poultry carcasses are moved along the lower run of the conveyor, carried into engagement with a series of successive cutting stations 61, 62, 63 and 64. An additional processing station can be mounted to the breast filleting apparatus 10 for removing the skin from the poultry carcasses, if left on prior to the introduction of the poultry carcasses into the breast filleting apparatus and if so desired. The processing station 66 comprises a skin remover that can be raised and lowered into and out of the processing path of the poultry carcasses and includes a pair of skinning rollers 67 each having a series of teeth 68 helically formed thereabout. A motor (not shown) rotates the skinning rolls in meshing engagement with one another such that as the poultry carcasses are moved along the length of the skinner rolls, the skin of the poultry carcasses is engaged and pulled from the meat of the poultry carcasses by the meshing teeth of the skinning rolls. The skin is dropped away from the poultry carcasses into a collection means for disposal, etc. If the poultry carcasses previously have been skinned prior to their processing by the breast filleting apparatus 10 or the skin is to be left on the meat, the skin remover can be lowered out of the processing path 29 of the poultry carcasses to avoid the engagement of the poultry carcasses by the teeth of the skinning rolls.

Figure 3:
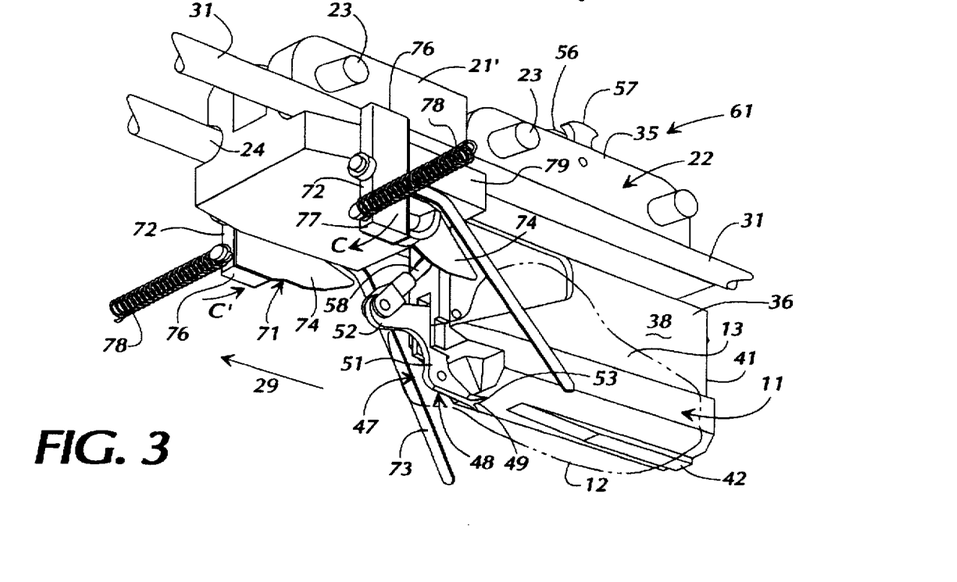
FIG. 3 is a perspective view illustrating the precutting station as a poultry carcass enters the precutting station.

As the poultry carcasses are carried further along their processing path 29 along the lower run of the conveyor, the poultry carcasses are carried into engagement with the first cutting station 61. As shown in FIGS. 1 and 3, the first cutting station 61 comprises a precutter having includes a pair of cutting implements 71 positioned on opposite sides of the processing path 29. The cutting implements have a substantially mirror constructions and each include a support block 72 pivotally mounted to the framework of the breast filleting apparatus, an elongated guide finger 73 and an angled cutting blade 74. The support blocks generally are substantially rectangularly-shaped blocks formed from a metal such as stainless steel and each has an upper end 76 and a lower end 77. Tension springs 78 are mounted to the lower ends 77 of the support blocks 72 and tend to pull the lower ends of the support blocks outwardly from the processing path, causing the upper ends 76 of the support blocks to be pivoted toward the conveyor 17.

As FIG. 3 illustrates, each of the spacer blocks 21' immediately preceding a module 22 includes a cam block 79 mounted along the longitudinal side surfaces thereof. The cam blocks 79 are substantially wedge-shaped blocks formed from the same nylon material as the spacer blocks and modules and engage the upper ends 76 of the support blocks as the spacer blocks are moved through the precutter by the conveyor 17. The cam blocks tend to urge the upper ends of the support box outwardly, causing the lower ends of the support blocks to be pivoted inwardly in the direction of arrows C and C'. As a result, the guide fingers 73 and cutting blades 74 of the precutter are moved into alignment with the poultry carcasses moving along their processing path.

As FIG. 3 illustrates, the guide fingers generally are elongated rods formed from metal or similar resilient, rigid material and extend rearwardly and slightly outwardly and downwardly from the support blocks. The guide fingers tend to gather and urge the poultry carcasses against the side surfaces 37 and 38 of the middle body portions 36 of the modules, aligning the poultry carcasses with the cutting blade 74. Each of the cutting blades is an angled knife blade that is adapted to cut into the poultry carcasses adjacent the lower back portions thereof, cutting between the lower ends of the ribs (not shown) of the skeletal structures of the poultry carcasses and the meat of the lower back portions to begin the separation of the meat of the poultry carcasses from the ribs of the skeletal structures.

Figure 4:
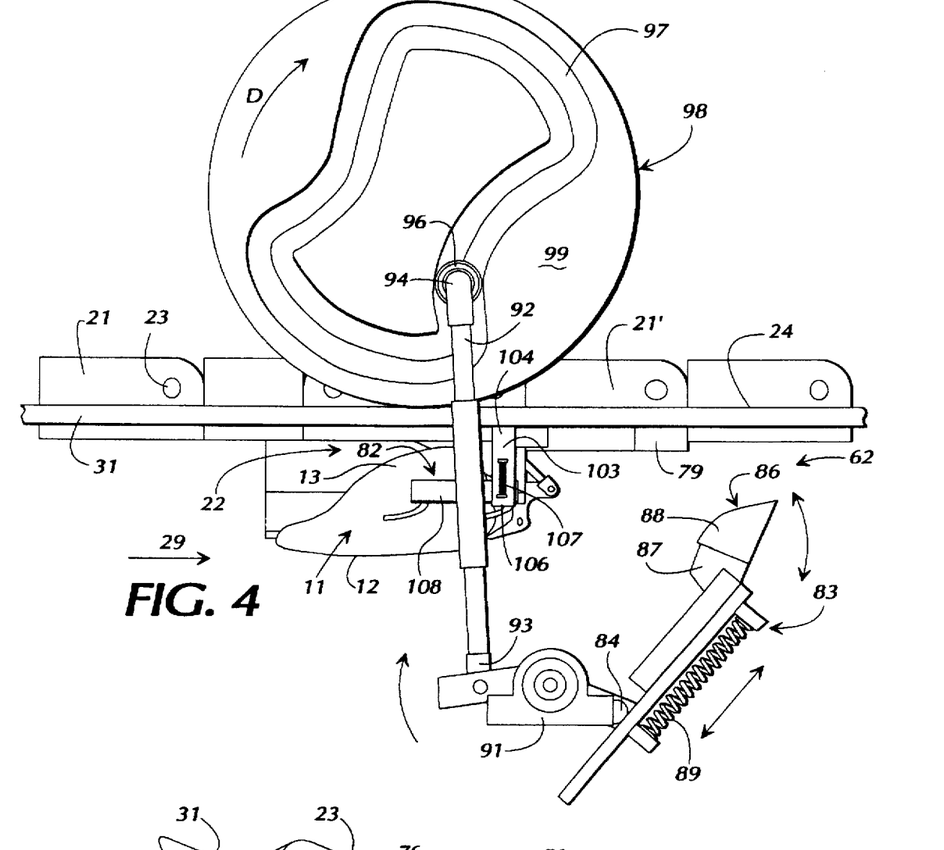
FIG. 4 is a side elevational view illustrating the middle block assembly and the pivoting motion of the plow blade of the middle block assembly.

As illustrated in FIGS. 1 and 4, a second cutting station, comprising a middle block assembly 62, is positioned downstream from the precutter 61. The middle block assembly includes a pair of side blocks 82 and a bottom block 83 mounted on a rotatable axle or shaft 84. The bottom block further includes a slotted plow blade 86 slideably mounted to a blade support block 87. The slotted plow blade 86 generally is comprised of a pair of spaced curved cutting blades 88 defining a recess therebetween of a width sufficient to enable the keel bones of the poultry carcasses to pass between the cutting blades. The curved configurations of the cutting blades 88 generally correspond to the shape of the breast bones and keel of the poultry carcasses to enable the cutting blades to closely cut and follow along the breast bone and keel bone of the carcasses to separate the meat therefrom. As FIG. 4 illustrates, a compression spring 89 is mounted to the blade support block 87 and is attached to the slotted plow blade 86. The compression spring biases the plow blade upwardly with respect to the support block to the position illustrated in FIG. 4. As the plow blade cuts into and rides along the poultry carcasses, the plow blade can be moved downwardly against the bias of the spring 89 to prevent the plow blade from gouging or splintering the bones of the skeletal structures of the poultry carcasses.

As shown in FIGS. 1 and 4, a bracket 91 is mounted to the axle 84 opposite the blade support block 87 and is pivotally mounted at its opposite end to a cam linkage 92. As FIG. 4 illustrates, the cam linkage 92 includes a first end 93 that is pivotally attached to the bracket 91, and a second end 94 having a cam roller 96 attached thereto. The cam roller 96 engages and rides along a cam track 97 formed in a large rotating guide wheel 98 that is rotatably mounted to the framework 16 of the breast filleting apparatus. The guide wheel 98 generally is formed from a pair of substantially circular discs 99 and 101 mounted back-to-back. The cam track 97 is formed in the outwardly facing side surface of disc 99, generally being formed in a substantially hour-glass configuration along which the cam roller 96 moves as the guide wheel is rotated. The second disc 101 generally is a large rotating sprocket similar to conveyor sprockets 26 and 27 and has a series of recesses or gaps 102 formed about its circumference. These recesses receive the pusher pins 23 of the spacer blocks 21 and modules 22 to cause disc 101, and thus disc 99, to rotate in the direction of arrow D in timed relation with the movement of the conveyor 17 along its lower run. As the wheel 98 is rotated in the direction of arrow D, the cam linkage 92 is raised and lowered as its cam roller 96 rolls along the cam track 97. As a result, the bracket 91 is pivoted upwardly and downwardly and in response, the axle 84 is rotated, causing the bottom block 83 to pivoted upwardly and downwardly into and out of the processing path of the poultry carcasses in timed relation with the movement of the poultry carcasses along the lower run of the conveyor.

As further illustrated in FIGS. 1 and 4, each side block assembly 82 has a substantially mirror construction of the other and each includes a support block 103 pivotally mounted to the framework of the breast filleting apparatus and having an upper end 104 and a lower end 106. A tension spring 107 is attached to the framework and to the lower end 106 of each support block 103 and tends to bias the lower ends outwardly, away from the processing path of the modules, causing the upper ends 104 of the support blocks to be tilted toward the conveyor 17 into a position to be engaged by the cam blocks 79 mounted to spacer blocks 21'. The engagement of the upper ends of the support blocks by cam blocks 79 urges the upper ends 104 of the support blocks 103 outwardly and the lower ends 106 inwardly toward the modules. Presser plates 108 are mounted to interior surfaces of the support blocks, arranged so as to engage the poultry carcasses as a result of the engagement of the support blocks 103 with the cam blocks 79 of the spacer blocks 21'. The presser plates tend to laterally compress the wishbones or clavicles of the carcasses so that the wishbones will pass between the cutting blades 88 of the slotted plow blade, with the keel bones of the carcasses passing through the slot defined between the cutting blades to prevent the cutting blades 88 from engaging and gouging the bones. Once the carcasses initially are engaged by the plow blade, the cam blocks of the spacer blocks will tend to move pass the support blocks 103 of the side block assembly, causing the presser plates to be moved out of engagement with the carcasses to avoid interfering with the cutting of the carcasses by the plow blade.

Figure 5:
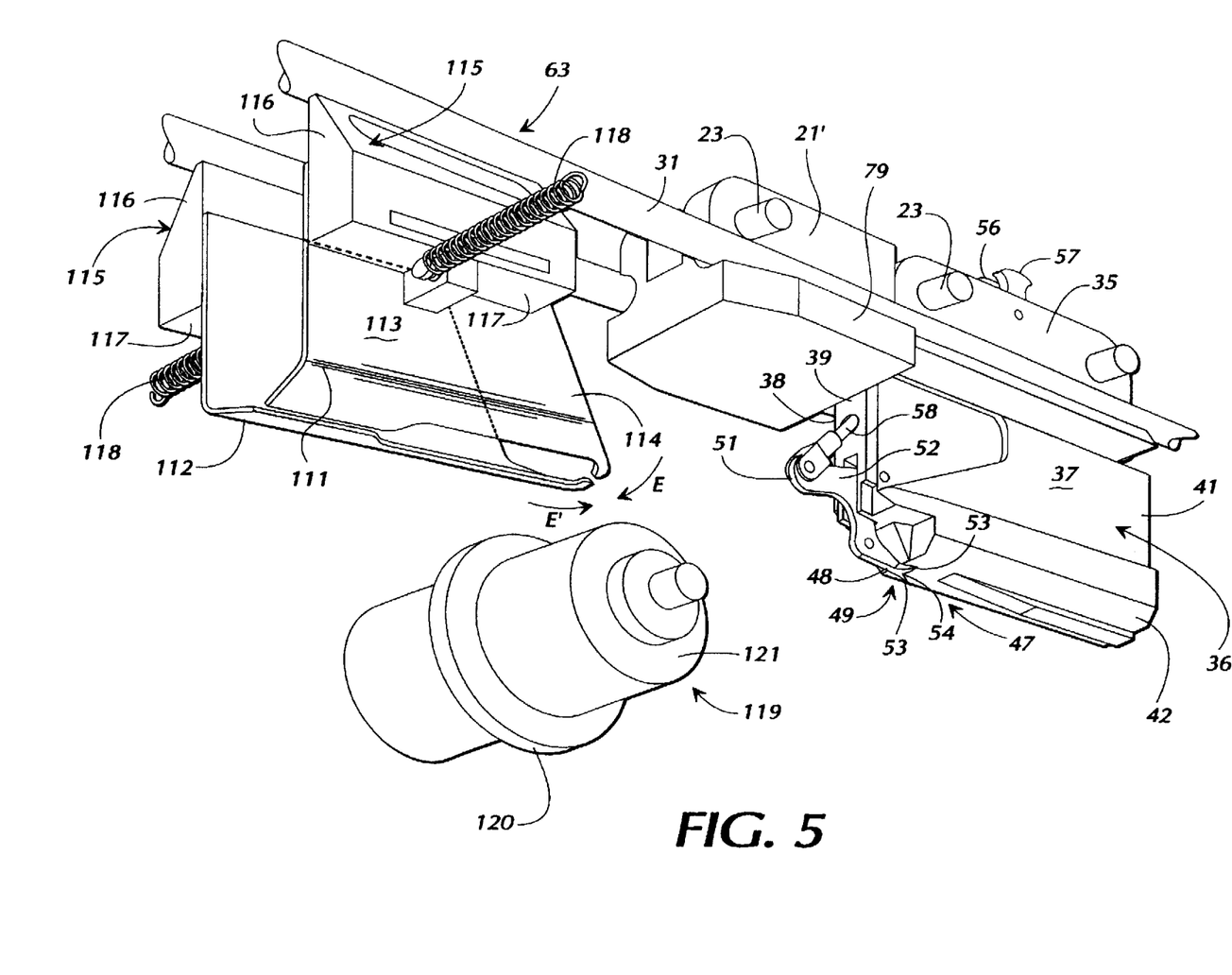
FIG. 5 is a perspective illustration of the fillet tunnel blades and how the modules pass therethrough.

As FIG. 1 illustrates, a third processing station 63 comprising a fillet tunnel assembly is positioned immediately downstream from the middle block assembly 62 in the path of travel of the modules along their processing path. As shown in FIG. 5, the fillet tunnel assembly includes a pair of tunnel blades 111 and 112, having reversed, complimentary shape. Each tunnel blade generally is substantially L-shaped and includes a side wall 113 and a tapered inwardly facing front edge 114. Each tunnel plate is supported by a support plate 115 that is pivotally attached to the framework of the breast filleting apparatus and which includes an upper end 116 positioned so as to be engaged by the cam blocks of the spacer blocks 21', and a lower end 117 to which a tension spring 118 is mounted. The springs 118 tend to urge the lower ends of the support plates outwardly, causing the tunnel plates ordinarily to be spread outwardly out of the processing path of the birds. The support plates 115 function as levers for pivoting the tunnel blades inwardly toward each as the cam block 79 of spacer blocks 21' engage the upper ends 118 of the support plates. When the tunnel blades 111 and 112 move toward each other to the position shown in FIG. 5, the spacing of the side walls 113 of the tunnel blades is such that the skeletal structures of the carcasses just fits within the side walls 113 so that the front edges 114 of the tunnel blades tend to cut into the carcasses adjacent the skeletal structures so as to complete the cutting and scraping away of the meat of the breast and adjacent back portions of the poultry carcasses from the skeletal structures thereof.

As further illustrated in FIGS. 1 and 5, a fillet splitter 119 is mounted below the tunnel assembly 63. The fillet splitter 119 comprises a pair of circular cutting blades or discs 120 mounted on a rotatable shaft 121, spaced from each other. The fillet splitter is movable vertically into and out of the processing path 29 (FIG. 1) of the poultry carcasses. With the fillet splitter in its raised position, the cutting blades of the fillet splitter engage the meat of the carcasses as the meat is cut from the skeletal structures of the carcasses to separate the meat into separate portions.

Figure 6:
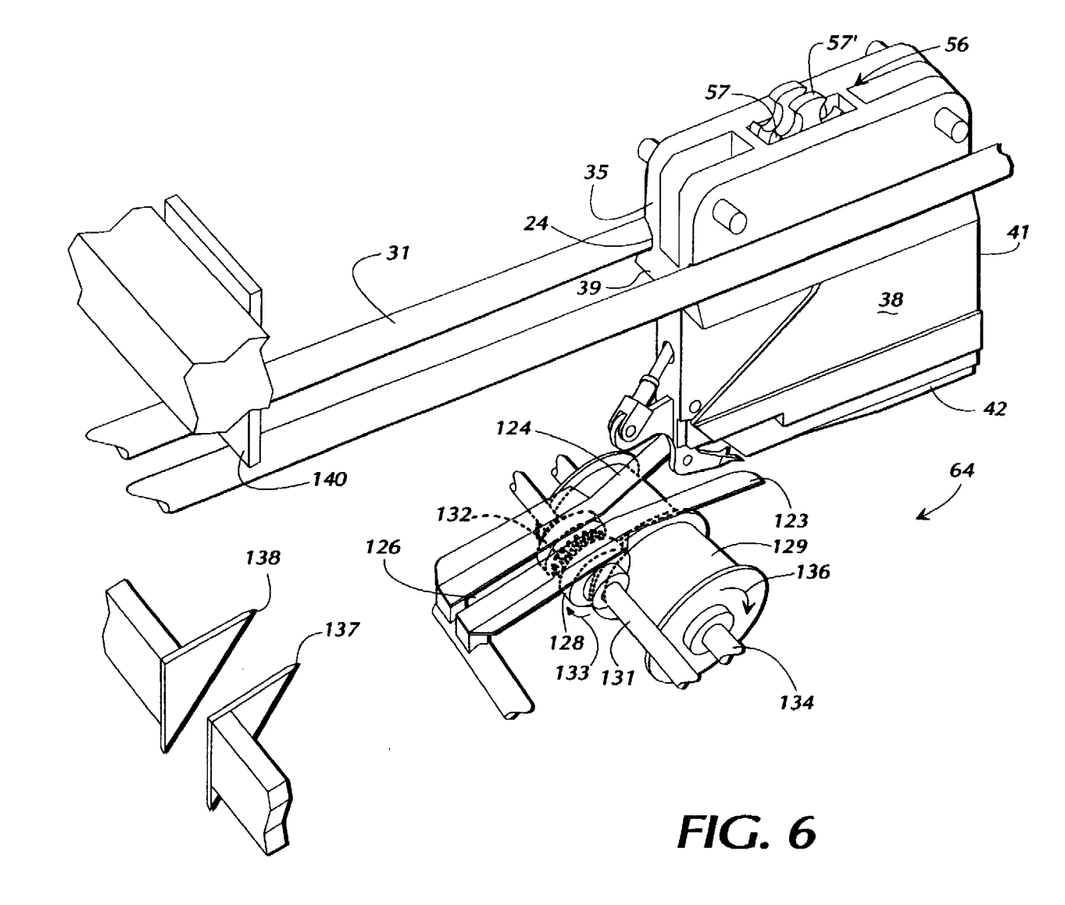
FIG. 6 is a perspective view illustrating the filletcam plate and the second cam plate and removal blades for dislodging the skeletal structures of the poultry carcasses after the fillets have been removed therefrom.

As shown in FIGS. 1 and 6, a fourth processing station 64 comprises a fillet remover assembly positioned further along the processing path 28 of the modules, immediately downstream from the fillet tunnel assembly 63. The fillet remover assembly 64 includes a pair of spaced fenders 123 and 124 that define a slot 126 therebetween. The fenders are mounted to and supported at one end on a stationary support rod 127 and project rearwardly along the processing path from the support rod 127. The fenders 123 and 124 diverge away from each other toward their rearward ends so as to form a wedge shape at this portion of the slot. The fillet remover 64 further includes a pair of fillet remover gears 128 and a remover roll 129 positioned in a staggered relationship below the fenders 123 and 124. The fillet remover gears 128 are mounted on a common shaft 131 in an opposed, parallel relationship and each include a series of spaced teeth 132. The gears rotate in the direction indicated by arrow 133 such that the rearward facing surfaces of the gears rotate downwardly with respect to the oncoming module and poultry carcass. Likewise, fillet remover roll 129 is mounted to and rotates on a shaft 134 in the direction indicated by arrow 136 so that its rearwardly facing surface rotates in a downward direction with respect to the oncoming module and poultry carcass for stripping the meat from the skeletal structures.

As FIGS. 1 and 6 illustrate, a pair of stationary stripper blades 137 and 138 are mounted to the framework, positioned along on the processing path 28. The stripper blades generally comprise substantially triangularly shaped plates spaced apart a distance slightly greater than the width of the modules so that the modules can pass therebetween. The skeletal structures of the carcasses 11, however, are engaged by the stripper blades 137 and 138, which tend to urge the carcasses downwardly and off of the module for removal of the skeletal structures therefrom. The skeletal structures are allowed to drop downwardly through the framework to a collection means (not shown) while the modules proceed along the conveyor and are inverted into their upright attitude for receiving new poultry carcasses for processing.

A second cam plate 140 is positioned above the lower run 19 (FIG. 1) of the conveyor 17 along the path of travel of the module 22. The cam plate 140 generally is a substantially rectangularly-shaped plate that is mounted to the framework and projects downwardly toward the conveyor, in position to engage the arms 57' of the cam wheels 56 of the module that project upwardly from the modules. As the arms 57' engage the second cam plate, the cam wheels are rotated rearwardly and downwardly, tending to pull the connecting linkage 58 downwardly. As a result, the clamp tool 46 of each module is pivoted into its unclamped, non-engaging position (as shown in dashed lines in FIG. 2A) in the direction of arrows A', releasing the skeletal structures from their bearing engagement between the clamp tools and the top and middle body portions of the module. With the clamp tools released from the skeletal structures of the carcasses 11, the skeletal structures can be quickly and easily urged off of the modules by the stripper blades at the end of a filleting operation.

In the operation of the breast filleting apparatus 10 (FIG. 1), an operator (not shown) mounts a series of previously eviscerated poultry carcasses 11 on modules 22. The poultry carcasses 11 are placed upon the modules 22 with the interior cavities defined by their skeletal structures receiving the top portion 42 of a module therein and with the skeletal structures of the carcasses bearing against the side surfaces 37 and 38 of the middle body portions 36 of the modules. The loaded modules are carried along a processing path 29, proceeding along the upper run 18 of the conveyor 17 on which the modules are supported and carried. As the carcasses begin their movement along their processing path 29, the downwardly depending arms 57' of cam wheels 56 of the modules are carried into engagement with an upstanding first cam plate 59. As the downwardly extending arms 57' engage first cam plate, the cam wheels are rotated in the direction of arrows B (FIG. 2A). In response, the clamp tools 48 of the modules are pivoted in the direction of arrows A into a clamping position shown in FIGS. 2A and 2B.

In this clamping position, the clamp tool of each module engages the breasts 12 of the poultry carcasses 11 in tight bearing engagement with the keel bones 14 of the poultry carcasses received within bone receiving recesses 54 formed between the tines 53 of the clamp tools 48. The clamp tools urge the carcasses tightly against the pins 46 (FIG. 2A) of the modules with the modules received within the interior cavities of the carcasses. The meat of the interior cavities of the carcasses is engaged by and impaled upon the pins 46, which, together with the engagement of the clamp tools, holds the carcasses in place and prevents the carcasses twisting or shifting during cutting operations. Thus, the poultry carcasses are locked in place securely and automatically as the loaded modules begin their movement along their processing path 29. Immediately following the clamping of the poultry carcasses 11 against their modules 22, the modules are carried about a first guide sprocket 26, causing the modules to be inverted and the grooves 24 formed along the base portions 35 of the modules to be aligned with guide rods 31 as the modules begin to move along the lower run 19 of the conveyor 17, as illustrated in FIG. 1. Generally, prior to being mounted on the modules 22 of the breast filleting apparatus 10, the poultry carcasses 11 previously would have been eviscerated and their wings, legs, necks, thighs and skin removed. However, it is possible to mount the carcasses on the modules without their skin first having been removed. If the skin of the carcasses has not been removed prior to introduction of the carcasses into the poultry breast filleting apparatus 10, a skin remover assembly 66 can be positioned at the start of the path of movement of the loaded modules along the lower run of the conveyor. The skin removing assembly can be raised into a position within the processing path of the poultry carcasses so that the helical teeth 68 of the skinning rolls 67 of the skin removing assembly tend to engage and gather the skin of the poultry carcasses and tend to pull the skin of the poultry carcasses downwardly and away from the carcasses. The skin can be discarded into a collection means for further processing or discard.

As shown in FIGS. 1 and 3, as the poultry carcasses are moved along the lower run 19 of the conveyor 17, the poultry carcasses 11 initially are engaged at a precutter or first cutting station 61. As the modules approach the precutter, cam blocks 79 mounted to the side surfaces of the spacer blocks 21' immediately preceding the modules 22 engage the upper ends 76 of support blocks 72. The cam blocks 79 tend to urge the upper ends 76 of support blocks 72 outwardly, causing the guide fingers 73 and cutting blades 74 of the precutter to be pivoted inwardly in the direction of arrows C and C' into engagement with the poultry carcasses. The guide fingers tend to press the sides of the poultry carcasses against the side surfaces 37 and 38 of the modules 22, pressing the bones of the skeletal structures against the side surface of the modules to ensure that the bones of the skeletal structures will pass adjacent and just inside the cutting blades 74. The cutting blades cut into the poultry carcasses adjacent the lower ends of the ribs of the poultry carcasses, scraping along the rib bones so as to create a guide incision or precut between the back meat and the free ends of the ribs to begin the separation of the meat from the skeletal structures.

As shown in FIGS. 1 and 4, following the precutting of the poultry carcasses, the poultry carcasses are engaged at a second cutting station, comprising a middle block assembly 62. As the poultry carcasses enter the middle block assembly, the cam blocks 79 of the spacer blocks 21' engage the upper ends 104 of support blocks 103, causing the lower end of the support blocks to be pivoted inwardly, so as to move presser plates 108 into engagement with the sides of the poultry carcasses. The engagement of the poultry carcasses by the presser plates tends to lift the meat of the poultry carcasses and align the initial cuts or guide openings formed therein by the precutter with the cutting blades 88 of a slotted plow blade 86 that is pivoted upwardly toward engagement with the poultry carcasses in timed relation with the movement of the poultry carcasses through the middle block assembly. The cutting blades 88 engage the sides of the carcasses, passing through the initial cuts formed by the precutter and cutting through the meat along the rib bones of the skeletal structure of the poultry carcasses. The slotted plow blade is biased downwardly along its plate support block 87 against the force of spring 89 by the forward movement of the poultry carcasses along the conveyor. As a result, the slotted plow blade tends to ride along and closely match the shape of the rib cage of the skeletal structures of the poultry carcasses adjacent the keel bones thereof. With the keel bones passing through the slot formed between the cutting blades of the slotted plow blade the bearing of the carcasses against the plow blade tends to urge the plow blade downwardly against the compression spring 89. As a result, the meat of the carcasses can be cut from the bones of the skeletal structures with the danger of the bones being engaged or gouged by the cutting blades minimized.

As FIGS. 1 and 5 illustrate, the poultry carcasses next are carried into engagement with a fillet tunnel assembly 63 in which the tunnel blades 111 and 112 thereof are pivoted into a cutting position within the processing path 29 of the poultry carcasses by the engagement of support plates 115 by the cam blocks 79 of spacer blocks 21'. The shape and configuration of the tunnel blades approximately matches the configuration of the skeletal structures of the poultry carcasses such that the tunnel blades tend to cut into the meat of the poultry carcasses adjacent the bones of the skeletal structures thereof. The tunnel blades scrape along the bones of the skeletal structures, to scrape the meat from the skeletal structures of the poultry carcasses, leaving the meat hanging downwardly, attached to the skeletal structures only along the keel bone thereof.

After the stripping of the meat of the breasts and back portions 12 and 13 from the skeletal structures of the poultry carcasses 11, the poultry carcasses are carried, with the meat hanging downwardly therefrom, into engagement with a fillet remover 64. When a module 22 approaches the fillet remover 64, a substantial amount of the meat will have been removed from the skeletal structure supported on the module and will be hanging downwardly from the module. The downwardly hanging portion of the meat will pass beneath the fillet remover and become engaged by the rearwardly moving facing surfaces of the fillet remover roll, which tends to apply a downward and rearward force to the oncoming meat, tending to pull the meat away from the skeletal structure of the carcass 11. Further, the fenders of the fillet remover tend to further guide the clinging portion of the meat toward the slot so that further friction is applied by the fenders to the meat. The keel bone tends to pass through the slot between the fenders and the teeth 132 of the gears 128, which tend to brush against the keel bone and remove the fleece from the breast and keel bone. The additional friction applied by the fenders and the teeth of the gears tends to strip any remaining portions of the meat from the skeletal structures of the carcasses module and the meat tends to drop in a downward direction away from the module, while the skeletal structures of the carcasses tend to remain on the modules.

With the fillets of meat having been stripped away from the skeletal structures of the poultry carcasses, the modules are carried further forwardly into engagement with a second cam plate 140, which is engaged by the cam wheels of the modules. As a result, the cam wheels are rotated rearwardly, causing the connecting linkages 58 between the cam wheels and clamp tools to be pulled inwardly through the modules, causing the clamp tools to be pivoted rearwardly in the direction of arrows A' (FIG. 2A) to their unclamped position releasing the skeletal structures of the poultry carcasses. Thereafter, the skeletal structures of the poultry carcasses engage stripper blades 137 and 138, which tend to urge the skeletal structures downwardly and off of the modules for collection and removal. The modules, thus cleared of the skeletal structures of the poultry carcasses, pass about a second conveyor sprocket 27 and are reoriented into their upright position for loading with additional poultry carcasses as the modules continue along their processing path.

It will be understood by those skilled in the art that the foregoing invention has been described in relation to a preferred embodiment thereof, and that many modifications, additions and deletions may be made thereto without departing from the spirit and scope of the invention as set forth in the following claims.

We claim:

1. A filleting apparatus for removing fillets of breast and back meat from the skeletal structures of previously eviscerated poultry carcasses, comprising:

an apparatus frame;

a conveyor means mounted on and movable about said frame along a processing path;

a plurality of modules mounted on said conveyor means each for receiving a poultry carcass and for moving the poultry carcasses in series along said processing path;

said modules each sized and shaped so as to approximately fit the skeletal structures of the poultry carcasses to maintain the shape of the skeletal structures during meat removal operations;

each of said modules including a top surface and prongs mounted to and protruding from said top surface and adapted to pierce the poultry carcass placed on the module and prevent the poultry carcass from shifting during cutting;

each of said modules including clamping means including a clamp tool having spaced tines for straddling said prongs and clamping the skeletal structure against said prongs, said clamp tool automatically movable between an unclamped position and a clamping position wherein said spaced tines of each module engage a poultry carcass on opposite sides of the keel bone thereof and urge the poultry carcass against said prongs and hold the skeletal structures of the poultry carcass against its module as said modules are moved along their processing path during the removal of the fillets from the carcasses, and a means for moving said clamp tool between its clamped and unclamped positions; and a series of meat removal stations positioned along said processing path and adapted to engage the poultry carcasses in sequence as the poultry carcasses move along their processing path to remove fillets of breast and back meat progressively from the skeletal structures of the poultry carcasses.

2. The filleting apparatus of claim 1 and wherein said means for moving said clamp tool comprises cam wheels rotatably mounted to each of said modules along a lower surface thereof and connected to said claiming means such that as said cam wheels is engaged and rotated, said claiming means is moved into and out of bearing engagement with poultry carcasses.

3. The filleting apparatus of claim 1 and wherein said meat removal stations include a middle block assembly having a slotted center cutting blade adapted to engage the poultry carcasses between the meat and skeletal structures thereof and remove the meat from the skeletal structures, and guide plates adapted to engage the meat of the poultry carcasses and guide the meat and skeletal structures of the poultry carcasses into engagement with said slotted center cutting blade.

4. The filleting apparatus of claim 1 and wherein said meat removal stations include a precutting station, a middle block assembly, and a tunnel assembly positioned in succession along said processing path for engaging and successively cutting fillets of breast and back meat from the skeletal structures of the poultry carcasses.

5. The filleting apparatus of claim 4 and further including fillet separating means having a first position interposed in said processing path for engaging and separating the fillets being removed from the poultry carcasses, and a second position displaced from said processing path.

6. The filleting apparatus of claim 1 and further including a skin removal means positioned upstream from said series of meat removal stations and adapted to engage and pull the skin from the poultry carcasses.

7. A filleting apparatus for removing fillets of breast and back meat from the skeletal structures of previously eviscerated poultry carcasses, comprising:

an apparatus frame;

a conveyor means mounted on and movable about said frame along a processing path;

a plurality of modules mounted on said conveyor means for moving poultry carcasses along said processing path;

said modules each sized and shaped so as to approximately fit the skeletal structures of the poultry carcasses to maintain the shape of the skeletal structures during meat removal operations, said modules including means for holding the poultry carcasses mounted to a top surface of each of said modules and adapted to engage and hold the poultry carcasses and prevent the poultry carcasses from shifting during cutting and clamping means automatically movable into engagement with the poultry carcasses as said modules are moved along their processing path for urging and holding the skeletal structures against said modules during the removal of the fillets from the carcasses;

said means for holding the poultry carcasses mounted to a top surface of each of said modules comprises outwardly projecting prongs that engage the meat of the poultry carcasses as the poultry carcasses are received on the modules;

said clamping means for clamping the skeletal structure against said prongs comprises a clamp tool having spaced tines for straddling said prongs; and a series of meat removal stations positioned along said processing path and adapted to engage the poultry carcasses in sequence as the poultry carcasses move along their processing path to remove fillets of breast and back meat progressively from the skeletal structures of the poultry carcasses.

8. A method of removing fillets of meat from the skeletal structures of previously eviscerated poultry carcasses, comprising:

mounting each carcass on a module with the skeletal structure of each carcass received and fitted about its module and in engagement with prongs protruding from the module;

moving the modules in spaced series with the carcasses mounted thereon along a processing path;

automatically actuating a clamping tool having opposed tines mounted to each module as the modules move along their processing path so as to move the clamping tools into engagement with the carcasses mounted on the modules such that the tine straddle each keel bone of the poultry carcass and the prongs of the module, said clamping tools urging the carcasses against their modules and into engagement with the prongs mounted to the modules to maintain the carcasses on the modules in a stable, secure position during processing; and as the modules move along the processing path, engaging the carcasses at a series of successive meat removal stations and separating the meat and skeletal structures of the carcasses and removing the fillets of meat from the skeletal structures.

9. The method of claim 8 and wherein the step of automatically actuating a clamping means comprises engaging a cam wheels mounted to each module as the modules move along the processing path and, in response to the engagement of the cam wheels, moving a clamp tool toward or away from locking engagement with the skeletal structures of the carcasses so as to urge the skeletal structures into tight bearing engagement against the modules to hold the skeletal structures of the carcasses against the modules during removal of the fillets therefrom or to release the carcasses from the modules.

10. The method of claim 8 and further including the step of urging the skeletal structures of the carcasses off of the modules after the fillets of meat have been removed therefrom.

11. The method of claim 8 and wherein the step of engaging the carcasses at successive meat removal stations comprises precutting the carcasses at a precutting station, engaging the carcasses with a middle block assembly to substantially cut the meat of the carcasses from the rib bones of the skeletal structures thereof, and moving the modules through a tunnel assembly to complete the cutting of the meat from the skeletal structures.

12. A filleting apparatus for removing fillets of meat from the skeletal structures of previously eviscerated poultry carcasses, the apparatus including a frame, a conveyor means mounted about the frame for moving the poultry carcasses along a processing path, and a series of meat removal stations positioned along the processing path for removing the meat from the skeletal structures of the poultry carcasses, the improvement therein comprising:

a series of modules mounted to the conveyor in spaced series therealong and adapted to receive and support the poultry carcasses thereon, said modules formed with a shape that substantially corresponds to the shape of the skeletal structure of each poultry carcass, prongs mounted to a top surface of each module and adapted to engage the skeletal structures of the poultry carcasses to hold the poultry carcasses on said modules and against shifting; and a clamping means having a clamp tool including spaced tines for straddling said prongs that is automatically movable between a clamping position in beating engagement with the poultry carcasses in response to the movement of the modules along the processing path for urging the skeletal structures of the carcasses into tighter engagement with said prongs and for holding the carcasses against said modules to prevent the skeletal structures from becoming dislodged from said modules during removal of the fillets of meat from the skeletal structures, and an unclamped position following the removal of the meat from the skeletal structures of the poultry carcasses in response to the movement of the modules further along the processing path to enable the skeletal structures to be removed from said modules.

13. The filleting apparatus of claim 12, and wherein said clamp tool includes spaced tines that engage the poultry carcasses on opposite sides of the keel bones thereof and which hold the poultry carcasses against said modules in tight bearing engagement during meat removal operations.

14. The filleting apparatus of claim 12 and further including a cam wheels rotatably mounted to each of said modules along a lower surface thereof and connected to said clamping means, and cam plates mounted at upstream and downstream ends of the processing path and mounted adjacent said conveyor means in a position to engage said cam wheels of said modules as said modules move along the processing path to cause said cam wheels to rotate, whereby as said cam wheels rotate, said clamping means are moved into and out of locking bearing engagement with poultry carcasses.

15. A filleting apparatus for removing fillets of meat from the skeletal structures of previously eviscerated poultry carcasses, the apparatus including:

a frame, a conveyor means mounted about the frame for moving the poultry carcasses along a processing path, a series of meat removal stations positioned along the processing path for removing the meat from the skeletal structures of the poultry carcasses, a series of modules mounted to the conveyor in spaced series therealong and adapted to receive and support the poultry carcasses thereon, said modules each formed with a shape that substantially corresponds to the shape of the skeletal structure of a poultry carcass, each said modules including at least two prongs mounted to and protruding upwardly from a top surface thereof and adapted to engage and hold a poultry carcass against lateral shifting on said module, a clamping means including spaced tines straddling said prongs and movable into a clamping position in bearing engagement with the poultry carcass supported on its module as said modules move along the processing path for urging the skeletal structures of the carcasses into tighter engagement against said prongs of said modules to prevent the skeletal structures from becoming dislodged from said modules during removal of the fillets of meat from the skeletal structures, including a means for moving said clamping means, said conveyor means including actuating means adapted to be engaged by said means for automatically moving said clamping means with respect to said modules and said prongs.

16. The filleting apparatus of claim 15, and wherein said clamping means of said modules comprises a substantially arcuate clamp tool having spaced tines that engage the poultry carcasses on opposite sides of the keel bones thereof, and which hold the poultry carcasses against said modules in tight bearing engagement against said prongs during cutting operations.

17. The filleting apparatus of claim 15, and wherein said means for moving said clamping means includes cam wheels rotatably mounted to each of said modules along a lower surface thereof and connected to said clamping means for moving said clamping means, and wherein said actuating means comprises cam plates mounted along the processing path adjacent said conveyor means in positions to engage said cam wheels of said modules as said modules move along the processing path to cause said cam wheels to rotate, whereby as said cam wheels rotate, said clamping means are moved into and out of locking bearing engagement with the poultry carcasses carried by the modules.

* * * * *